United States Patent [19]

Takaoka

[11] 4,177,411
[45] Dec. 4, 1979

[54] SPEED-AND-PHASE CONTROL CIRCUIT FOR A ROTARY MACHINE

[75] Inventor: Saburo Takaoka, Tokorozawa, Japan

[73] Assignee: Pioneer Electronic Corporation, Tokyo, Japan

[21] Appl. No.: 929,053

[22] Filed: Jul. 28, 1978

[30] Foreign Application Priority Data

Jul. 28, 1977 [JP] Japan .................................. 52-90569

[51] Int. Cl.$^2$ .............................................. H02D 5/06
[52] U.S. Cl. ..................................... 318/314; 318/318; 318/341
[58] Field of Search ................. 318/314, 318, 341, 503

[56] References Cited

U.S. PATENT DOCUMENTS

| | | | |
|---|---|---|---|
| 3,478,128 | 11/1969 | Grace | 318/318 |
| 3,609,488 | 9/1971 | Sampson et al. | 318/318 |
| 3,952,237 | 4/1976 | Kimizuka | 318/318 |
| 4,061,950 | 12/1977 | Kayanuma | 318/314 |

Primary Examiner—David Smith, Jr.
Attorney, Agent, or Firm—Sughrue, Rothwell, Mion, Zinn and Macpeak

[57] ABSTRACT

A speed-and-phase control circuit for a rotary machine. A frequency divider is responsive to an input signal whose frequency is proportional to the revolution number of the rotary machine. The frequency divider provides as a first output signal a frequency-divided version of the input signal. A logical circuit is responsive to the input signal and to the first output signal. The logical circuit provides in timed relationship first, second and third timing pulses. The pulse width of the first timing pulse and of the second timing pulse is equal to a half period of the input signal. The pulse width of the second timing pulse is equal to one period of the input signal. The rising edge of the first timing pulse is substantially coincident with the falling edge of the input signal, the rising edge of the second timing pulse is substantially coincident with the falling edge of the first timing pulse, and the rising edge of the third timing pulse is substantially coincident with the falling edge of the second timing pulse. A charging circuit charges a first capacitor to a predetermined voltage level in response to the first timing pulse. A discharge circuit discharges according to the constant current mode the first capacitor circuit in response to the second timing pulse. A first gate circuit transfers the charge present on the first capacitor circuit to a second capacitor circuit in response to the second timing pulse. A second gate circuit transfer the charge present on the first capacitor circuit to a third capacitor circuit in response to a reference pulse having a reference phase. The speed and phase of the rotary machine is selectively controlled in accordance with the voltages present on the second and third capacitor circuits.

5 Claims, 2 Drawing Figures

SPEED-AND-PHASE CONTROL CIRCUIT FOR A ROTARY MACHINE

BACKGROUND OF THE INVENTION

1. Field of the Invention

The present invention relates to a speed-and-phase control circuit adapted to control the rotational speed-and-phase of a rotary machine.

2. Description of the Prior Art

A speed control circuit is frequently employed for constant speed control of a rotary machine, such as an electric motor. Such a conventional speed control circuit is responsive to an alternating current signal that is generated by the rotary machine and has a frequency which is proportional to the number of revolutions of the rotary machine per unit time. The alternating current signal is converted by the constant speed control into a direct current signal whose amplitude is proportional to the frequency of the alternating current signal. The direct current signal is then compared to a reference voltage signal so as to produce a difference signal. The difference signal is used as a feed-back signal and, thus, allows the constant speed control circuit to provide the constant speed control of the rotary machine.

If synchronization of the revolution number of the rotary machine with a reference signal of predetermined frequency or if coincidence of rotation phase with the phase of a signal of predetermined frequency is required, however, a rotation phase control circuit is needed in addition the speed control circuit described above. A device having both a phase control circuit and a speed control circuit is electronically complicated and is difficult to build and maintain.

Several attempts have been made to simplify the device having both a phase control circuit and a speed control circuit. One such approach employs a circuit which exhibits several major deficiencies. For example, the circuit employs a monostable multivibrator whose time constant inherently varies with temperature, and, thus, the circuit characteristics are prone to be unstable. Furthermore, the circuit needs capacitors to form the monostable multivibrator, and, therefore, in the case where the circuit is manufactured in the form of an integrated circuit, it is necessary to provide the capacitors externally.

SUMMARY OF THE INVENTION

Accordingly, an object of the present invention is to provide a rotation speed-and-phase control circuit for a rotary machine, which is simple to construction, which exhibits a high stability, and which requires only a few capacitors.

The present invention is a speed-and-phase control circuit for a rotary machine. A frequency divider is responsive to an input signal whose frequency is proportional to the revolution number of the rotary machine. The frequency divider provides as a first output signal a frequency-divided version of the input signal. A logical circuit is responsive to the input signal and to the first output signal. The logical circuit provides in timed relationship first, second and third timing pulses. The pulse width of the first timing pulse and of the second timing pulse is equal to a half period of the input signal. The pulse width of the second timing pulse is equal to one period of the input signal. The rising edge of the first timing pulse is substantially coincident with the falling edge of the input signal, the rising edge of the second timing pulse is substantially coincident with the falling edge of the first timing pulse, and the rising edge of the third timing pulse is substantially coincident with the falling edge of the second timing pulse. A charging circuit charges a first capacitor to a predetermined voltage level in response to the first timing pulse. A discharge circuit discharges according to the constant current mode the first capacitor circuit in response to the second timing pulse. A first gate circuit transfers the charge present on the first capacitor circuit to a second capacitor circuit in response to the second timing pulse. A second gate circuit transfer the charge present on the first capacitor circuit to a third capacitor circuit in response to a reference pulse having a reference phase. The speed and phase of the rotary machine is selectively controlled in accordance with the voltage present on the second and third capacitor circuits.

DETAILED DESCRIPTION OF THE INVENTION

Figure 1:
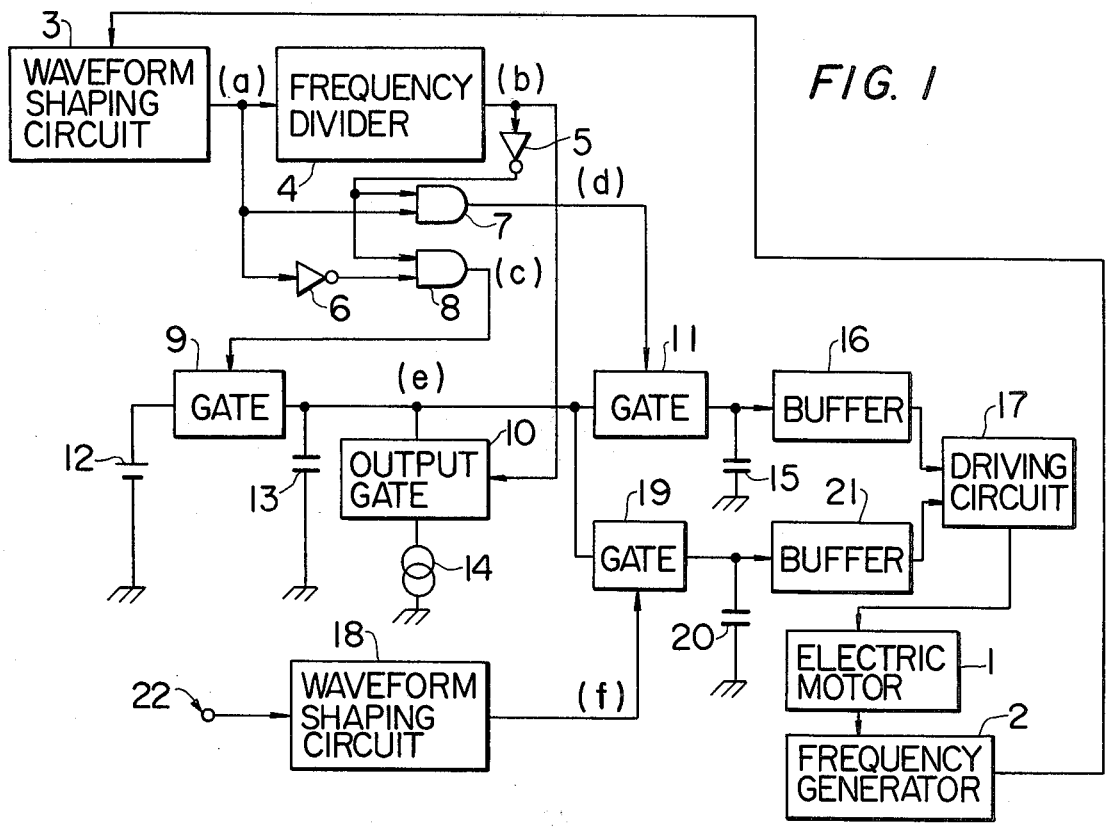
FIG. 1 is a block diagram showing one example of a speed-and-phase-control circuit for a rotary machine according to the present invention.
Figure 2:
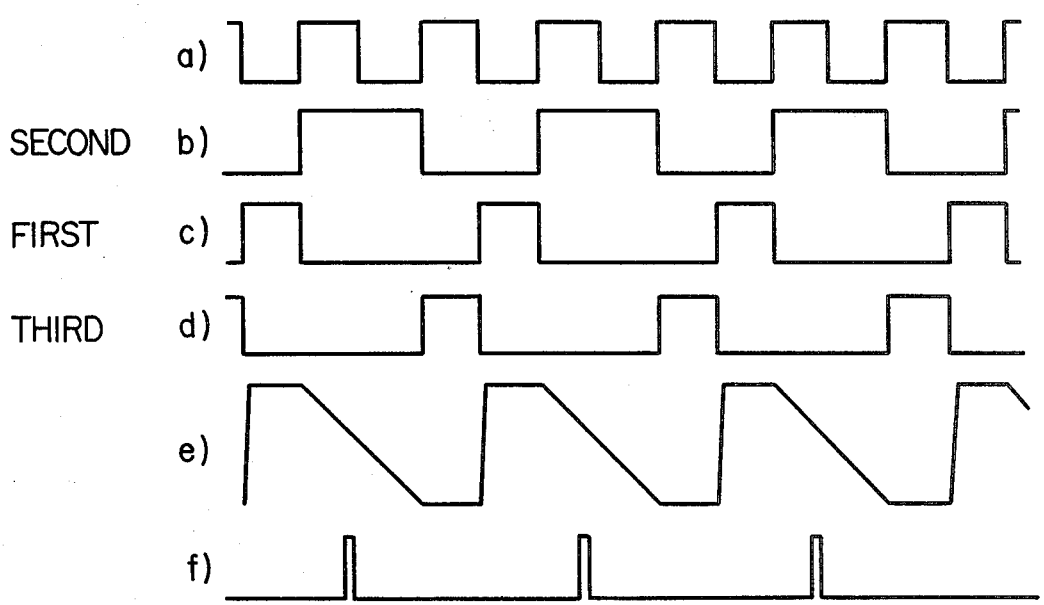
FIG. 2 is a waveform diagram representing the operation at several nodes in the circuit shown in FIG. 1.

The present invention is described with reference to the accompanying drawings. FIG. 1 shows one example of a speed-and-phase control circuit according to the present invention, and FIG. 2 is a waveform diagram representing the operation at several different nodes in the circuit shown in FIG. 1. It should be noted that the reference characters in FIG. 2 correspond to the characters in FIG. 1.

Referring to FIG. 1, a signal having a frequency proportional to the number of revolutions of an electric motor 1 is generated by a frequency generator 2. The output of frequency generator 2 is shaped into a rectangular wave by a waveform shaping circuit 3. The rectangular wave output of the waveform shaping circuit is subjected to a ½ frequency division operation by a frequency divider 4, so as to provide a second timing signal for opening an output gate 10. The pulse width of the second timing signal is equal to one period of the output of the frequency generator 2.

The outputs of waveform shaping circuit 3 and frequency divider 4 are subjected to a logical synthesization by inverters 5 and 6 and AND gates 7 and 8, which form first and third timing signals for opening respective gates 9 and 11. The pulse width of each of the first and third timing signals is equal to one-haf (½) of the period of the output of the frequency generator 2. The aforementioned first, second and third timing signals are shown by the waveform traces (c), (b) and (d), respectively, of FIG. 2. As shown in FIG. 2, each of the three timing pulses opens its respective gates when it is in the logic high level.

The operation of the speed-and-phase control of the present invention is now described. First, gate 9 is opened by the first timing signal (c), which causes a first capacitor 13 to be charged to a voltage equal to a reference voltage present at a reference voltage source 12. Then, gate 10 is opened by the second timing signal (b) as gate 9 is beng closed, causing first capacitor 13 to be discharged in the constant current mode by a constant current source 14 in a period of time corresponding to one period of the output of frequency generator 2. Then, when gate 10 is closed so as to stop the discharging of capacitor 13, gate 11 is opened by the third timing signal (d), causing a second capacitor 15 to be charged to a value equal to the voltage present across first capacitor 13. In the present case, first capacitor 13 is charged to a voltage obtained as the result of discharging, in the constant current mode, for a period of time corresponding to one period of the output of the frequency generator 2. Thus, the voltage present on first capacitor 13 corresponds to the period of the output of the frequency generator 2, this causing the voltage present on second capacitor 15 also to correspond to the same period.

Next, the first timing signal (c) occurs again, causing gate 9 to be opened and first capacitor 13 to be charged to the reference voltage present as reference voltage source 12. At the same time, gate 11 is closed, and, therefore, the terminal voltage on second capacitor 15 is maintained unchanged. The terminal voltage present on second capacitor 15 is applied through a buffer 16 to a driving circuit 17 of the electric motor 1. Buffer 16 has a very high input impedance so that second capacitor 15 is not discharged thereby. The driving circuit 17 operates to drive the electric motor 1 in the forward direction so as to increase the revolution number thereof when the terminal voltage on second capacitor 15 is at a low level, which is due to a low output frequency from a frequency generator 2. The driving circuit 17 also operates to drive the electric motor in the reverse direction so as to decrease the revolution number thereof when the terminal voltage on second capacitor 15 is at a high level, which is due to a high output frequency from frequency generator 2. Thus, the electric motor 1 is controlled by driving circuit 17 so that electric motor 1 is rotated at a constant speed. It should be noted that driving circuit 17 is made up of a differential circuit having two input terminals. The output signal from buffer 16 is applied to the first input terminal, and a reference voltage from a buffer 21 (discussed below) is applied to the second input terminal.

As shown in FIG. 1, a reference voltage signal is applied to a reference signal input terminal 22 and is subjected to waveform shaping by a waveform shaping circuit 18, which results in a signal having a narrow pulse width being generated, as shown by waveform trace (f) in FIG. 2. The output signal from waveform shaping circuit 18 having the narrow pulse width is applied to a gate 19. When electric motor 1 is being rotated substantially in steady state, the terminal voltage present on first capacitor 13 is of a trapezoid waveform, as indicated by waveform trace (e) of FIG. 2. A third capacitor 20 is charged to the terminal voltage present on first capacitor 13 when gate 19 is opened by the timing signal (f) from waveform shaping circuit 18. Accordingly, when the phase of the terminal voltage waveform present on first capacitor 13 lags the phase of the reference signal at the reference signal input terminal 22, the third capacitor 20 is charged to a high voltage level. However, when the phase of the terminal voltage waveform present on first capacitor 13 leads the phase of the reference signal at the reference signal input terminal 22, the third capacitor 20 is charged to a low voltage level.

The terminal voltage present on third capacitor 20 is applied to the motor driving circuit 17 through a buffer 21 having a function similar to that of buffer 16. In the phase case, when the terminal voltage on third capacitor 20 is high, the motor 1 is driven in the forward direction so as to compensate for the phase lag. When, however, the terminal voltage on the third capacitor 20 is low, the motor 1 is driven in the reverse direction so as to compensate for the phase lead. In other words, a control function performed so that the relation between the phase of the terminal voltage of the first capacitor 13 and the reference signal at terminal 22 is maintained constant. To put it another way, the motor driving circuit 17 operates to make the relationship between the rotation phase of the motor 1 and the phase of the reference signal at terminal 22 constant. Accordingly, in the phase case, the driving circuit 17 is made up of a differential circuit having two input terminals, with the reference voltage from buffer 21 and the output voltage from the buffer 16 being applied to the two respective input terminals.

In the above-described example, the frequency of the reference signal is selected so as to be ½ of the output frequency of the frequency generator 2 under the condition that the revolution number of the electric motor 1 is as stated above. In the embodiment of the present invention described above, the first, second and third timing signals are provided by means of the frequency divider 4 and the logical gates 5 through 8. It should be noted, however, that the ½ frequency division provided by frequency divider 4 may be replaced by an integer frequency divider in order to obtain the desired timing signals if the appropriate logical circuits are provided.

It should be noted that in the above-described embodiment, when gate 11 or gate 19 is opened, the charge present on the first capacitor 13 is transferred to the second or third capacitors 15, 20, respectively, which causes error because the voltage present on first capacitor 13 is decreased. However, if the capacitance value of the second and third capacitors 15, 20 is each selected to be smaller than the capacitance value of the first capacitor 13, the voltage variation on capacitor 13 is effectively eliminated.

In the application of the present invention where error must be reduced to an absolute minimum, a full-feed-back type differential amplifier may be employed to externally charge the second and third capacitors 15, 20 in such a manner that the potential on each becomes equal to the potential on the first capacitor 13. This approach causes the elimination of the errors due to capacitors 13, 15, 20.

In addition, in the above-described embodiment, the first capacitor 13 having the predetermined voltage is discharged by means of the constant current source 14. The same effect can be obtained, however, by charging the first capacitor 14. In such a case, the reference voltage 12 is made to be the ground voltage.

As is apparent from the above description, the speed-and-phase-control circuit for a rotary machine according to the invention can be manufactured in the form of an integrated circuit because the number of capacitors are relatively few, and because the required capacitors do not cause substantial temperature instability. Furthermore, the speed-and-phase control circuit is simple to build and maintain, and, yet, it provides control of both rotation speed and rotation phase of the rotary machine.

What is claimed is:
1. A speed-and-phase control circuit for a rotary machine, comprising:
   a. frequency divider means responsive to an input signal whose frequency is proportional to the revo- lution number of said rotary machine for providing frequency division of said input signal and for providing said frequency-divided input signal as a first output signal;

b. logical circuit means responsive to said input signal and to said first output signal for providing in timed relationship a first timing pulse having a pulse width equal to a half period of said input signal, the rising edge of said first timing pulse being substantially coincident with the falling edge of said input signal, a second timing pulse having a pulse width equal to one period of said input signal, the rising edge of said second timing pulse being substantially coincident with the falling edge of said first timing pulse, and a third timing pulse having a pulse width equal to a half period of said input signal, the rising edge of said third timing pulse being substantially coincident with the falling edge of said second timing pulse;

c. charging circuit means for charging a first capacitor circuit to a predetermined voltage level in response to said first timing pulse;

d. discharge circuit means for discharging according to the constant current mode said first capacitor circuit in response to said second timing pulse;

e. first gate circuit means for transferring said charge present on said first capacitor circuit to a second capacitor circuit in response to said second timing pulse; and f. second gate circuit means for transferring said charge present on said first capacitor circuit to a third capacitor circuit in response to a reference timing pulse having a reference phase, whereby the speed and phase of said rotary machine is selectively controlled in accordance with the voltages present on said second and third capacitor circuits.

2. The speed-and-phase control circuit for a rotary machine as recited in claim 1, further comprising, first buffer circuit means responsive to said voltage present on said second capacitor circuit for providing said voltage as a second output signal, said first buffer circuit means exhibiting a high input impedance, second buffer circuit means responsive to said voltage present on said third capacitor circuit for providing said voltage as a third output signal, said second buffer circuit means exhibiting a high input impedance, and driving circuit means responsive to said second and third output signals for providing a speed-and-phase control signal to said rotary machine derived in accordance with the difference between said second output signal and said third output signal.

3. The speed-and-phase control circuit for a rotary machine as recited in claim 1, wherein said logical circuit means includes first means for producing the logical product of the inverse of said input signal and the inverse of said first output signal, said logical product being said first timing pulse, and second means for producing the logical product of said input signal and the inverse of said first output signal, said logical product being said third timing pulse.

4. The speed-and-phase control circuit for a rotary machine as recited in claim 3, wherein said first means includes a first inverter having an input responsive to said input signal, a second inverter having an input responsive to said first output signal, and an AND circuit having a first input responsive to the output of said first inverter, a second input response to the output of said second inverter and an output, said output being said first timing pulse.

5. The speed-and-phase control circuit for a rotary machine as recited in claim 3, wherein said second means include a third inverter having an input responsive to said first output signal and an AND circuit having a first input responsive to the output of said third inverter, a second input responsive to said input signal and an output, said output being said third timing pulse.

* * * * *